Dec. 2, 1930. G. SUNDBACK Re. 17,891
FASTENER
Original Filed April 2, 1917 2 Sheets-Sheet 1
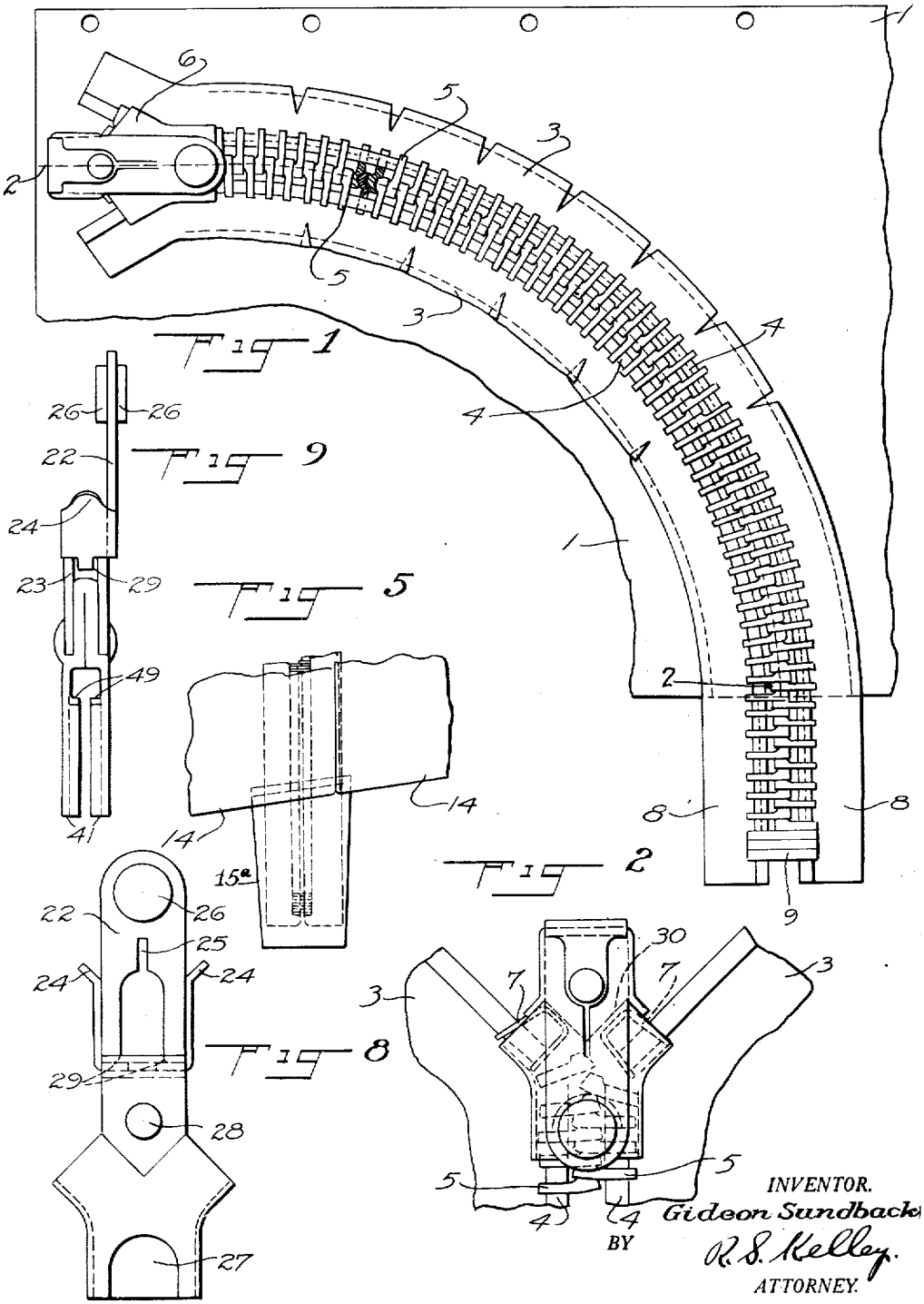

Dec. 2, 1930. G. SUNDBACK Re. 17,891

FASTENER

Original Filed April 2, 1917 2 Sheets-Sheet 2

INVENTOR.

BY Gideon Sundback

R. S. Kelley.

ATTORNEY

Reissued Dec. 2, 1930

Re. 17,891

UNITED STATES PATENT OFFICE

GIDEON SUNDBACK, OF MEADVILLE, PENNSYLVANIA, ASSIGNOR TO HOOKLESS FASTENER COMPANY, A CORPORATION OF PENNSYLVANIA

FASTENER

Original application filed April 2, 1917, Serial No. 159,139. Divided and application filed August 15, 1921, Serial No. 492,621. Patent No. 1,508,133, dated September 9, 1924. Application for reissue filed December 3, 1929. Serial No. 411,357.

This invention relates to fasteners of the type wherein closures for the edges of a garment, curtain, bag, tent or the like are to be separately connected by a fastener which embodies a sliding operating device which separates the edges when moved in one direction and closes them when moved in the opposite direction. Hitherto in the use of such fasteners, the degree of separation permitted has been limited by the fact that the edges had to remain joined at at least one point. By a novel arrangement of parts, involving the use of a flexible extension member, I have made it possible to secure as wide an opening as may be desired. By reason of this advantage, my invention is particularly applicable to such articles as corsets, spats, curtains, etc., where wide separation, without actual disconnection is required. This application is a division of my previous application for fastener, Serial No. 159,139, filed April 2, 1917, Patent No. 1,403,988, January 17, 1922.

With these and other objects in view, I have devised the apparatus embodying my invention, as described in the following specification and illustrated in the accompanying drawing, of which—

Fig. 1 is a plan view of the device as ordinarily applied,

Fig. 2 is a detail plan view of the fastening means,

Figures 3, 4, 6, 7:
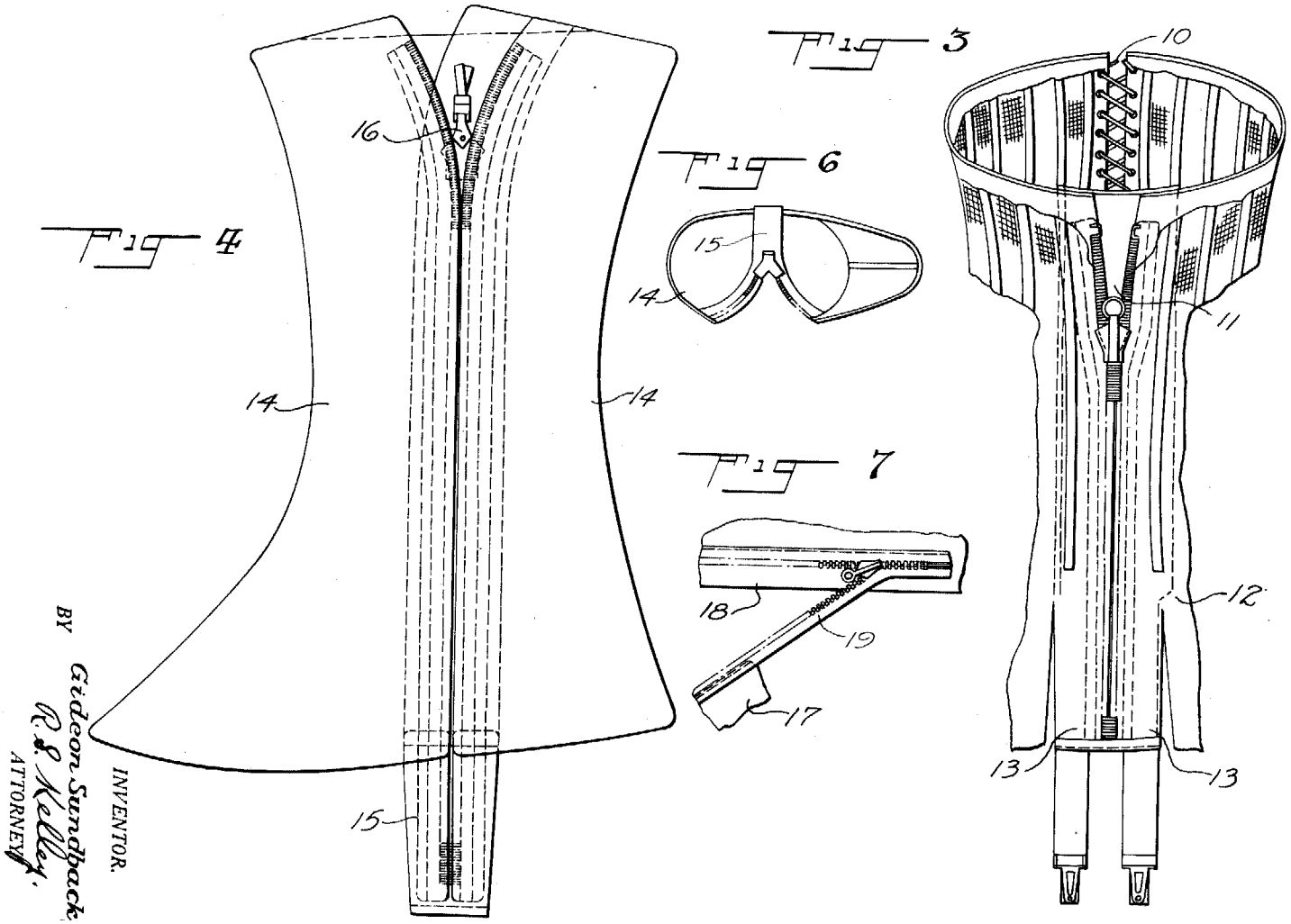
Fig. 3 is a perspective view of the device attached to a corset.

Fig. 4 is a side elevation of a spat showing the application of the device thereto, Fig. 5 shows a different mode of applying the device to a spat, Fig. 6 is an inverted plan view of a spat showing the degree of separation permitted by the device, and Fig. 7 is a side elevation of the device attached to a curtain, Fig. 8 shows the locking device in open position to be used as an actuating means, Fig. 9 is a side view of Fig. 8.

1 represents a body having edges 2 which are to be closed. The fastener embodies stringers 3, 3 composed of tapes having corded edges 4, 4 to which the interlocking members 5 are clamped in staggered relation. A sliding hollow Y-shaped cam 6 fits over members 5 and travels along edges 2 to engage or disengage the interlocking members 5 on the respective edges 2. Cam 6 has slotted sides through which the tapes extend laterally but which retain members 5 against forces tending to separate edges 2. The tapes of stringers 3 are stitched respectively to the separate portions of body 1 beyond edges 2. One or both of the stringers 3 are provided at the closing end with stop members 7 passing within the slider 6, and engaging the latter to prevent further movement.

Beyond the end of body 1 stringers 3, 3 are extended to constitute extensions 8, and these extensions are connected at their outer ends by link members 9 joining the respective stringers. The stringers in effect thus constitute a single body provided with a slit. Extensions 8 are preferably provided with interlocking members 5, and are of such a length that when slider 6 is stopped by link members 9, the body 1 can be separated to such an extent that the extensions 8, owing to their flexibility, will straighten out end to end. In the fasteners as heretofore used, without extensions, the end members 9 would directly connect the lower end of body edges 2, and slider 6 would consequently not go the entire length, thus preventing complete separation of edges 2. By reason of extensions 8 receiving slider 6, as much opening may be secured as desired, depending on the length of extensions 8. As the free edges of the extension 8 straighten out end to end, the maximum degree of separation of the lower edges of body 1 will be about twice the distance of the top of slider 6 from the lower edges of body 2.

In Fig. 3, the extension principle is applied to a boned edge corset, and permits the corset to be put on or taken off without requiring complete opening. 10 is the usual lacing, and 11 is the fastener of this invention. The body of the corset ends at 12, and 13 are the extension members. When the slider is moved down to the lower portion of the extensions 13, these can stretch out end to end to such an extent as to permit the corset to be stepped into or out of without complete separation, and when the slider is pulled up the corset will be quickly and firmly fastened.

In Fig. 4 is shown an application of the extension to a spat, in which 14 represents the body of the spat provided with the fastener as shown, the instep strap 15 being split and carrying the stringer extensions. When the slider 16 is moved down to the extreme bottom, strap 15 stretches out end to end and makes such a wide opening that the spat can easily be slipped on and off the foot without disconnecting the strap from the body, as is the usual custom. In Fig. 5 the strap 15*a* is not split as in Fig. 4, and only one stringer is connected thereto, the strap also being sewed only to the body 14 on the side to which the stringer is attached. Thus the slider can go down to the lower end of the stringers as in Fig. 4, and the stringers will stretch out end to end so as to provide the wide opening. Inasmuch as the body of the spat 14 overlaps the free side of the strap, it makes no difference that the strap is not attached to the body on both sides.

In Fig. 7 the extension principle is applied to a curtain 17 carried by a body or support 18, such as a tent, automobile top, etc., and the stringer extension 19 is sufficiently long to permit curtain 17 to be swung around relatively to the support when separated. The other stringer extension appears as attached to body 18 for its entire length but it may be partly free if desired. This arrangement is a decided advantage in enabling the curtain to be rolled up.

Another important feature of my invention is the locking means which is best illustrated in Figs. 2, 8 and 9. A sheet metal plate 22 is attached to the reinforcing loop 23 at the rear end of the slider by means of extensions 29, which are bent to lie within the loop 23 and serve as a pivot about which the plate 22 may be moved. The slider can be positively actuated in either direction by means of the plate 22 which functions as an actuator when lifted upwardly away from the slider and as a slider lock when pushed down so as to lie closely against the slider and overlap the closing end. Spring wings 24 project from the plate in a position offset from the longitudinal center line of the slider and offset laterally from the extensions 29. Such wings or projections act to block the passage through the slider and prevent relative movement between the slider and fastener stringers. Each of these wings in the embodiment illustrated, obstructs one of the diverging channels of the slider adjacent its rear end, that is, the wide end of the slider where the separated stringers project therefrom, when the plate 22 is swung downwardly into locking position. They will thus engage the stop member 7 and prevent their movement outwardly from the slider and thus lock the fasteners against opening.

It will also be apparent that when the slider is thus locked as illustrated in Fig. 2, that the locking wings 24 will project toward and into proximity to the corded edges 4—4 of the stringers, thus providing a more secure locking effect. In Fig. 2 it will be seen that the locking wings are positioned directly opposite the slider wedging portion 30. It will be noted that a slot 25 is provided in the plate 22 to increase its resiliency and small buttons or projections 26 furnish a convenient means for holding the plate 22 while operating the slider.

I claim:

1. In a body having meeting edges, means secured to and distributed along the length of said respective edges for connecting the same, means movable progressively along said edges to control said connecting means, and an extension beyond said body constituting in effect a continuation of said edges for receiving said movable means when said edges are disconnected, whereby to increase the separation.

2. The combination with a separable body portion, of stringers on the adjacent edges thereof extending substantially beyond the body portion, connecting members on the stringers, means sliding on the stringers to control the connection, and means beyond the body portion for limiting opening movement of said sliding means after it has passed substantially beyond said body portion.

3. The combination with a body portion having separable parts of stringers on the adjacent edges thereof extending beyond the body portion, means on the stringers for connecting the separable parts of the body portion, means sliding on the stringers to control the connection, said means when slid beyond the body portion substantially increasing the separation of the parts of the body portion without completely disconnecting it.

4. A body having meeting edges, members for connecting said edges, an operating device movable on said edges to control said members, and an extension beyond the body for receiving said operating device when said edges are separated whereby to increase the separation.

5. A body having an opening to be closed, a fastener having stringers longer than the opening to be closed, fastening members, carried by said stringers and operating means slidable upon the lengthened portions of the stringers when the fastener is opened.

6. A pair of body portions having relatively stiff edges, flexible stringers secured to and extending beyond said edges, means connecting the edges of said stringers, and means on said stringers for progressively connecting and disconnecting said edges and permitting said stringer extensions to stretch out end to end when said body portions are to have maximum opening.

7. A body portion of material provided with an opening therein, members for closing the opening, a slider movable along the edges of the opening and adapted to control said members, an extension secured to the body portion of said material and along which the slider is adapted to be moved to increase the separation of the opposite edges of the opening and means for locking said slider in position with said opening closed.

8. A fastener comprising two stringers carrying connecting members, a sliding device for operating said connecting members, a stop member on one of said stringers, and means carried on said sliding device, and cooperating with said stop member for locking the fastener.

9. A body portion of material having an opening therein, members for closing the opening, a slider movable along the edges of the opening and adapted to control said members, an extension secured to the body portion of the material and along which the slider is adapted to be moved to allow complete separation of said edges, said extension also being provided with opening and closing members therefor controlled by the slider, the opposite edges of the extension opening being permanently secured on the end of said opening remote from the body portion.

10. A body portion of material provided with a slit, members for closing the opposite edges of said slit, a slider movable along said edges for progressively controlling said members, an end member on at least one of said edges, and locking means carried by the slider adapted to retain said end member within said slider.

11. A spat provided with a longitudinal slit along one side, fastening members for closing said slit, and a slider movable along the edges of said slit for controlling said fastening members, an extension loop secured to the opposite sides of said spat and adapted to extend under the wearer's instep, said loop being slit in continuation of the longitudinal slit in the spat and provided with connecting members adapted to be controlled by said slider, the slit in said extension loop being of a length sufficient to permit removal of said spat.

12. An article having an opening to be closed including a body of material connected to opposite sides of said opening and having an extension beyond said article, said body of material being provided with a slit long enough to permit complete separation of the edges of said opening and a flexible fastener for said slit, and a slider progressively controlling said fastener and movable beyond said article.

13. A slider comprising a body having channels to receive stringers and means pivoted on said slider functioning as an actuator in one position and as a slider lock in another position to prevent movement of said slider along the stringers, said pivoted means comprising a plate pivoted to said slider to swing about an axis extending transversely of the stringers and parallel to the plane thereof, and a locking wing carried by said plate and arranged in locking position to block at least one of said channels at the rear end thereof.

14. A slider comprising a body having diverging channels to receive stringers, and locking means carried by the slider, said locking means comprising a member pivoted to swing upwardly from said slider to release the locking means and having a wing for obstructing at least one of said channels when said member is swung downwardly to lock the stringers at the wide end of the slider where the separated stringers project therefrom.

15. In combination, a pair of fastener stringers having spaced freely projecting members arranged on their adjacent edges, said members having attaching portions for securing them to the stringer and comprising end stop members and interlocking members, a slider comprising a body having channels to receive said stringers and means functioning as an actuator for said slider in one position and as a slider lock in another position, said means comprising a member pivotally attached to the slider, and a locking wing extending from said last mentioned member toward the adjacent stringer when in locking position to obstruct the passage through said slider and engage behind the projecting portion of one of said members to prevent relative movement between said slider and the stringers.

16. A slider comprising a body having channels to receive stringers and means pivoted thereon functioning as an actuator in one position and as a slider lock in another position, said means comprising a plate and means for pivotally connecting said plate to the slider, and a locking wing projecting from said plate and disposed laterally of said pivot.

17. A slider comprising a body having channels to receive stringers and locking means carried by the slider for locking the stringers, said means comprising a plate attached to said slider in position to overlie the closing end thereof, and a locking wing offset from the longitudinal center line of said slider projecting from said plate and adapted to obstruct at least one of said channels.

18. A slider comprising a body having channels to receive stringers and means pivoted thereon functioning as an actuator in one position and as a slider lock in another position, said means comprising a sheet metal plate having a wing bent up to project therefrom in a direction to obstruct one of said channels when in locking position.

19. A slider comprising a body having channels to receive fastener stringers, said body comprising overlying spaced wings, a locking means carried by the slider for locking same to said fastener stringers, comprising a plate attached to said slider functioning as an actuator for the slider in one position and said plate having a locking projection which functions in another position of said plate overlying the end of the top wing of said slider as a slider lock, said plate comprising a substantially flat member adapted in locking position to lie closely against the said top wing of the slider.

20. In combination, a pair of fastener stringers comprising a pair of corded edge tapes and series of interlocking members clamped to the corded edges of said tapes, a slider comprising a body having diverging channels movable along said stringers to engage and disengage said interlocking members and means pivoted on said slider functioning as an actuator in one position and as a slider lock in another position, said means comprising a plate pivotally attached to said slider to swing about an axis parallel to the plane of said stringers, and a wing projecting from said plate toward and into proximity to one of said tapes when in locking position.

21. In combination, a pair of separable fastener stringers comprising cooperating series of interlocking members on their adjacent edges, a slider comprising a body having channels to receive said stringers and movable along the same to engage and disengage said interlocking members, a stop member at the end of a series of interlocking members and locking means carried by the slider and movable into engagement with said stop member for locking the stringers.

22. A slider comprising a body having a Y-shaped channel with diverging portions at the rear-end converging into a single channel at the other end, and locking means pivoted to the slider to swing upwardly therefrom and movable into position to obstruct at least one of the diverging branches of said channel.

23. A slider comprising a body having channels to receive stringers, a pull member pivoted at one end to the slider functioning as an actuator in one position, and a projection on said pull member nearer to its pivoted end than to its front end functioning as a slider lock in another position of said pull member.

24. In combination, a pair of fastener stringers having interlocking fastening means on their adjacent edges, a projecting member on the edge of one stringer, said member having an attaching portion for securing it to the stringer and a portion projecting from the edge of said stringer, a slider comprising a body having channels to receive said stringers and a member pivotally attached to the slider functioning as an actuator for said slider in one position and as a slider lock in another position, and a locking wing extending from said last mentioned member toward the adjacent stringer when in locking position to obstruct at least one of said channels and engage behind the projecting portion of said member.

25. A slider movable along the edges of a slit for progressively opening or closing the slit, said slider having a channel for passage of members projecting from an edge of the slit, and slider locking means including a member transversely pivoted on the slider functioning as an actuator in one position and as a slider lock in another position, said pivoted member having a locking wing spaced a substantial distance from the free end of said member to obstruct said slider channel to prevent movement of said slider relative to said body of material.

26. A slider movable along fastener stringers to engage and disengage interlocking members on the stringers, said slider comprising a body having a passage therein to receive interlocking members, and slider locking means including a member pivoted on said slider functioning as an actuator in one position and as a slider lock in another position, said pivoted member being pivoted to swing about an axis parallel to the plane of said stringers, and a locking wing spaced from the free end of said member and offset laterally from the longitudinal center line of said slider, said wing projecting from the member toward and into proximity to one of the stringers to block the passage when said locking means is in locking position.

In testimony whereof I affix my signature.

GIDEON SUNDBACK.

CERTIFICATE OF CORRECTION.

Reissue Patent No. 17,891. Granted December 2, 1930, to

GIDEON SUNDBACK.

It is hereby certified that error appears in the printed specification of the above numbered patent requiring correction as follows: Page 1, line 4, for the word "separately" read separably; page 2, line 100, claim 3, after the word "parts" insert a comma; same page, line 118, claim 5, after the word "members" strike out the comma and insert same to follow "stringers" in line 119; and that the said Letters Patent should be read with these corrections therein that the same may conform to the record of the case in the Patent Office.

Signed and sealed this 27th day of January, A. D. 1931.

M. J. Moore,
Acting Commissioner of Patents.

(Seal)